Figure 1:
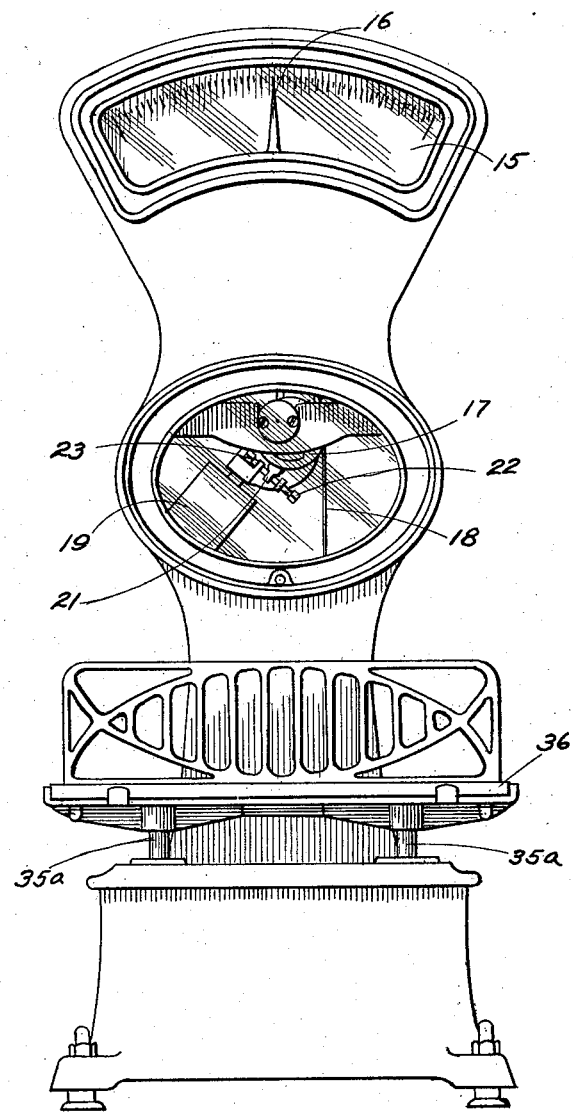

J. HOPKINSON.
COMPUTING SCALE.
APPLICATION FILED JULY 6, 1914.

1,151,593.

Patented Aug. 31, 1915.
5 SHEETS—SHEET 1.

Witnesses:
C. E. Burnap
Henry A. Parks

Inventor:
Joseph Hopkinson
By Sheridan, Wilkinson & Scott Attys

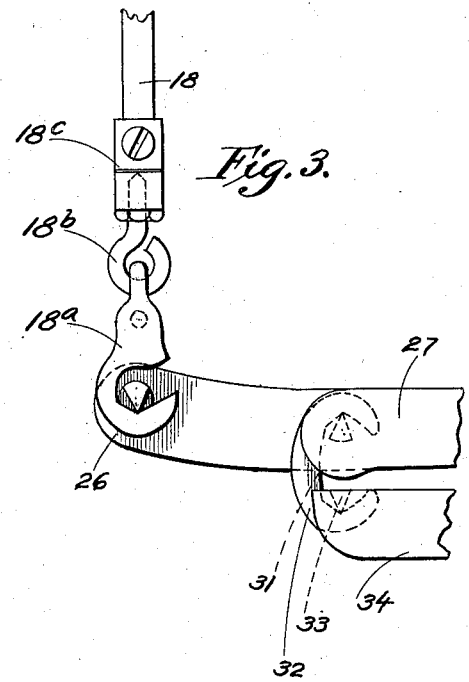
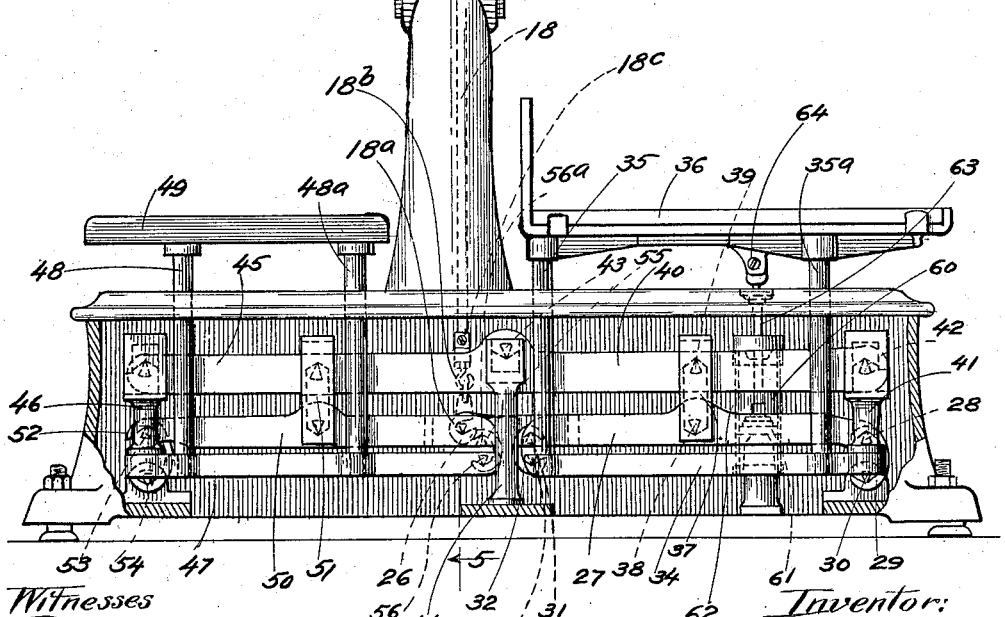

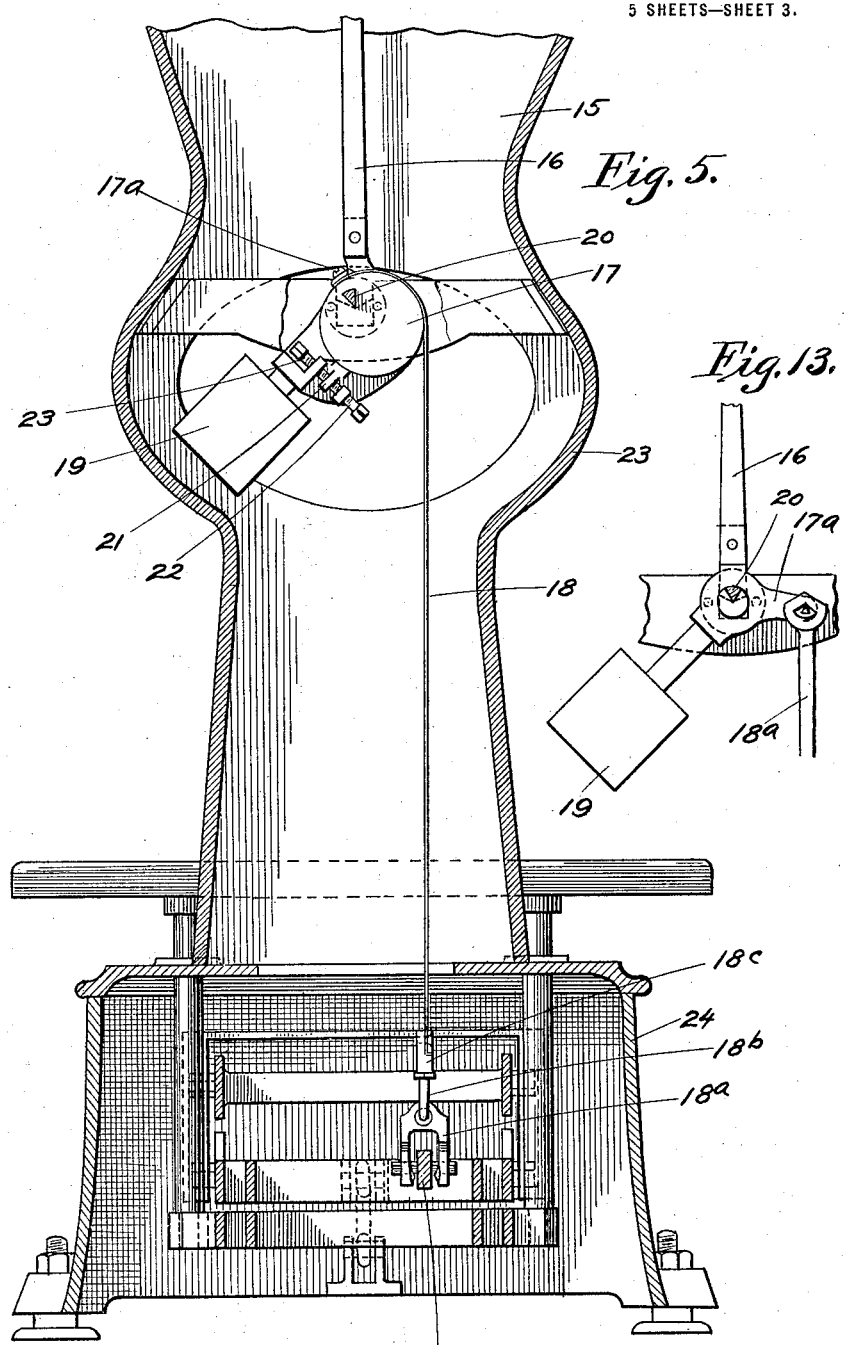

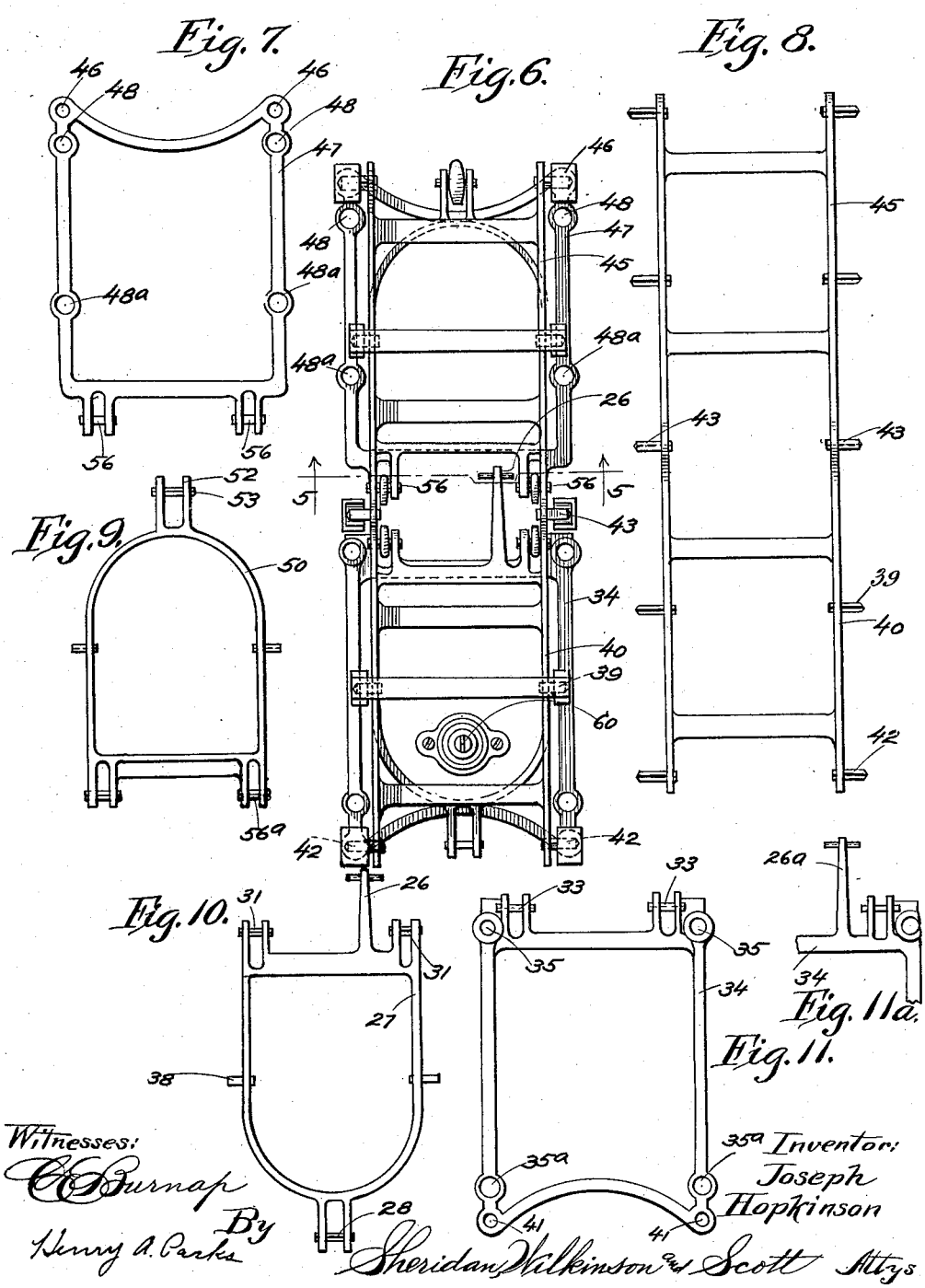

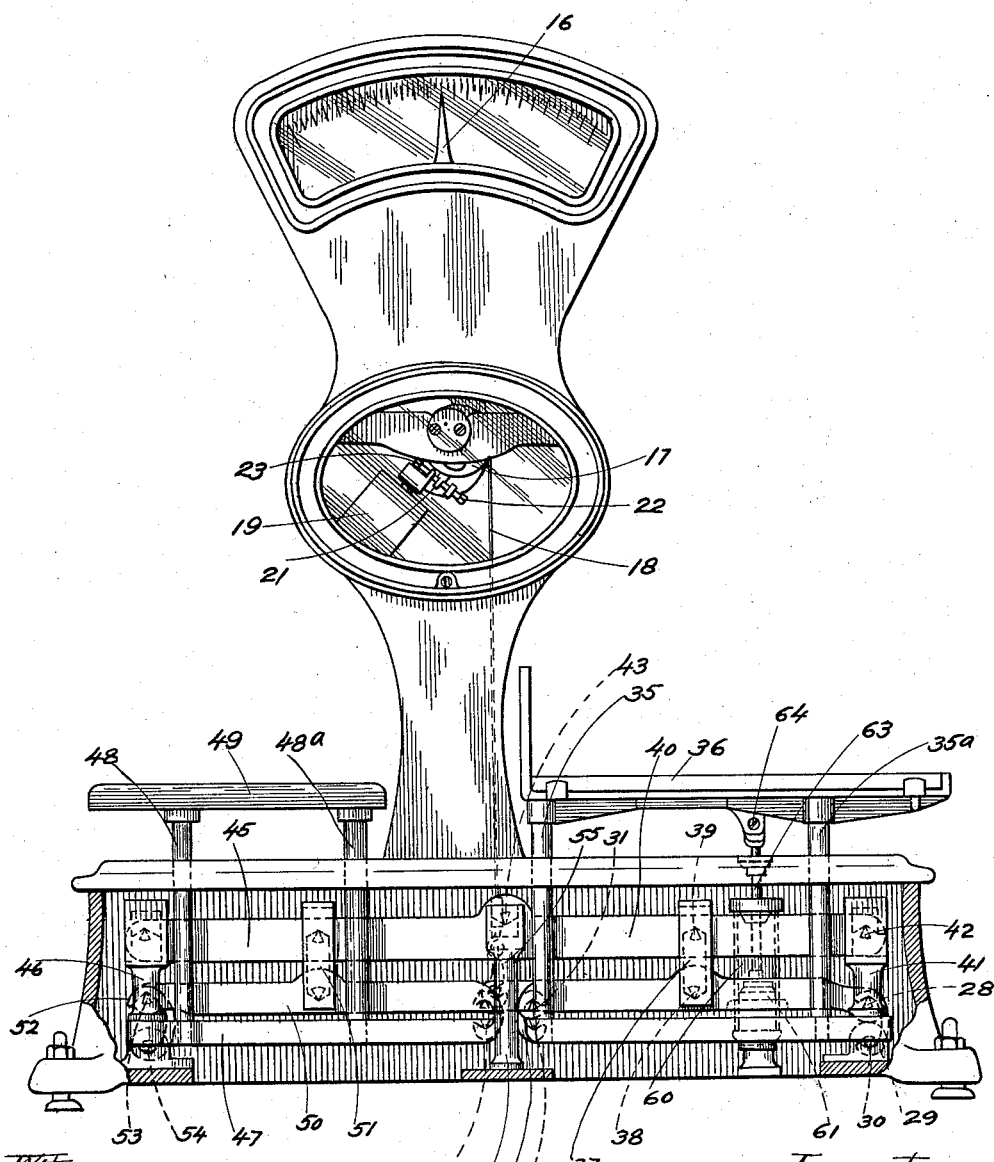

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

COMPUTING-SCALE.

1,151,593.  Specification of Letters Patent.  Patented Aug. 31, 1915.

Application filed July 6, 1914. Serial No. 849,188.

*To all whom it may concern:*

Be it known that I, JOSEPH HOPKINSON, a citizen of the United States, residing at Dayton, in the county of Montgomery and State of Ohio, have invented certain new and useful Improvements in Computing-Scales, of which the following is a specification.

My invention relates to computing scales in which the total weight and price are indicated.

An object has been to provide an automatic scale for weighing goods in which the computing chart has a position substantially above the middle of the base, either facing the platform beneath which the lever movement is disposed, or having a position in a plane parallel to said lever movement.

A further object has been to provide an automatic scale of this class in which no staying mechanism or checks are required for maintaining equilibrium in the platform and associated parts.

My invention also comprises a weight platform which is supported by the same system of levers which supports the goods platform.

My invention comprises novel connecting devices between the supporting levers and the computing and indicating mechanism comprising a flexible band attached at one end to one of said supported levers which has a downward movement and at the other end to a cam or eccentric secured to the indicating arm to move the latter across the chart.

My invention also includes a pendulum rigidly secured to the indicator of the computing mechanism, said pendulum and indicator being supported on knife edge bearings.

Other objects and advantages of my invention will be rendered apparent in the following specification when taken in connection with the accompanying drawings, in which—

Figure 1 is a front elevation of my improved scale; Fig. 2 is a side elevation thereof with portions of the base broken away to show the platform lever mechanism; Fig. 3 is a side elevation of the connection between the supporting levers and the weight which actuates the computing mechanism; Fig. 4 is an end elevation thereof; Fig. 5 is a vertical section taken substantially along the line 5—5 of Fig. 2; Fig. 6 is a plan view of the lever supports; Fig. 7 is a plan view of a detail of said lever supports; Fig. 8 is a plan view of one of said levers; Fig. 9 is a plan view of another of said levers; Fig. 10 is a plan view of the lever to which the lower end of the band is attached. Fig. 11 is a plan view of a detail of said supporting mechanism; Fig. 11$^a$ shows a modification in the band connection to the platform supports; Fig. 12 is an elevation of a modified form of my scale with portions broken away; and Fig. 13 is a modified detail of the connection between the indicator arm and the lever movement.

I have provided the vertically disposed chart 15 of a well-known form, over which moves the indicating arm 16, said arm being actuated by connecting mechanism leading to the platform 36 upon which the goods are placed. The arm 16 is rigidly attached to an eccentric 17 over which rolls a flexible member 18 preferably a steel band. This steel band is connected to the mechanism in the lower part of the scale which will be described later. A pendulum 19, angularly disposed with relation to arm 16, opposes the downward pull of the band 18, said pendulum also being rigidly secured normally to the arm 16 and eccentric 17. The knife edge 20 is rigidly secured to said parts and is provided with the usual supporting block carried by the main frame. The pendulum 19 is adjustable in its angular relation to the arm 16 and eccentric 17, the set screws 22 and 23 being adapted to bear at their ends upon the tongue or lug 21 secured to the eccentric 17 and arm 16. The eccentric 17 is disposed in such position with relation to the pendulum 19 that the variable moment of the band 18 counterbalances the variable resisting moment of the pendulum. The band 18 is pivotally connected at its lower end to the end 26 of the lever 27 by means of the loop or hook 18$^a$, which is provided with a V-shaped portion to receive the knife edge in the end of said lever. Said hook or loop is attached to said band by the eye-bolt or screw 18$^b$, which is secured to the band by means of the clamp 18$^c$. The lever 27 has a downward movement actuated by the goods upon the platform, etc., said lever having a fixed fulcrum at 28 in the link 29, which, in turn, is attached to the stationary frame. The pressure of the fulcrum is upwardly on said link, the friction being reduced by the knife edge bearings shown, and the lower end of said link is provided with similar knife edge bearings 30. A portion of the platform 36 rests upon the lever 27, its weight being transmitted thereto by the vertical posts 35, which are secured to the movable frame 34, at one end of which are knife edge bearings 33 resting upon bearings in links 32, these links, in turn, resting upon knife edge bearings 31 carried by said lever 27. The intermediate portion of the lever 27 is suspended from a longer horizontal lever 40 by the links 37, each of which is provided at its ends with bearings 38 and 39 which rest upon the usual knife edges. Another portion of the platform 36 is supported on the extreme end of the frame 34 by means of the vertical posts 35ª, which are secured to the movable frame 34. The corresponding end of frame 34 carries other upstanding posts 41 which are pivotally attached at their upper ends to said lever 40. These upright posts 41 are provided with suitable knife edge connections 42 with said lever. The platform 36 will therefore be seen to be partly supported by the inner end of the lever 27 and partly by the outer end of the lever 40.

The lever 40 is provided, midway its length, with the knife edge bearings 43 which rest upon the vertical posts 44 secured to the main frame. The opposite end 45 of said lever is pivotally connected by means of the upright posts 46 with the movable frame 47, which, in turn, supports the platform 49 by means of the upright posts 48, 48ª. The movable frame 47 is connected at its inner end with the lever 50 by means of the link 55. Said link 55 is pivotally attached to the frame 47 by the knife edge bearings 56, and to the lever 50 by the knife edge bearings 56ª. It will be seen that the platform 49 is partly supported by one end of the lever 40 and partly by one end of the lever 50. The lever 50 is fulcrumed to the main frame at 53 by means of the link 52. Said lever 50 is pivotally connected at the middle of its length to the arm 45 of the lever 40 by the link 51.

In order to check sudden movements and excessive vibration of the mechanism I have provided a dash-pot 60, of the usual construction, in which a piston 61, within the cylinder 62, is actuated by a stem 63, pivotally attached at 64 to the platform 36. The cylinder is suitably secured to the base of the frame of the scale.

The operation of the mechanism, therefore, consists in placing goods upon the platform 36, when the end 26 of the lever 27 will be moved downwardly. The downward movement of the platform 36 will cause an upward movement of the platform 49, and weights placed upon the platform 49 permit larger quantities of goods to be weighed upon the platform 36 than the capacity of the chart 15 alone provides for. The weight of the goods on the platform 36 causes a downward pressure on the inner end of the lever 27 and upon the outer end of the lever 40. In a similar manner the weight of the platform 49 causes a downward pressure upon the inner end of the lever 50 and outer end of the arm 45 of the lever 40. By means of this system of leverage the platforms 49 and 36 are maintained in stable equilbrium without the necessity of checks or other staying mechanism.

It will be seen that the goods platform and the weight platform both rest upon four posts, each making a four-point bearing, and that the relations of the lever 40 and lever 27 are such as to produce a parallel motion of the various parts in a vertical direction, thereby causing a perfect balancing thereof and maintaining the desired equilibrium. The same remarks apply to the platform 49, which rests upon the four posts 48, 48ª, which, in turn, transmit their downward pressures upon both the levers 50 and 40.

In the modification shown in Fig. 11ª, I have provided an arm 26ª on the movable frame 34, to which the lower end of the band 18 may be pivotally attached if desired. The arm 26ª has a downward movement when the goods are placed upon the platform 36, said movement being similar to that of the end of the lever 27.

In Fig. 12 I have shown a modification of the scale, in which the upper portion of the framework is placed at right angles to the position shown in Fig. 2, the chart having a position in the plane parallel to the lever movement below. In all other respects the scale shown in Fig. 12 is the same as that shown in Fig. 2.

In Fig. 13 I have shown a modification of the connection between the lever movement below and the indicating arm and pendulum. This modification comprises an arm 17ª, which may be substituted for the eccentric 17, said arm being actuated by a rod 18ª leading to the end of the lever 27. Movable knife edge bearings are provided in the ends of this rod for insuring the minimum of friction in the connections with said arm 17ª and lever 27.

While I have described my invention more or less precisely as regards the details of construction, I do not wish to be limited thereto unduly, as I contemplate changes in the form, in the proportion of the parts, and the substitution of equivalents, as circumstances suggest or render expedient without departing from the spirit of my invention.

I claim:—

1. In a device of the class described, a housing, two posts standing up therein from its base, a main rectangular lever frame within the upper part of the housing with knife edges midway on each side of the frame supporting it on said posts, other knife edges on the sides of the frame between the mid point of each side and the end thereof, two auxiliary lever frames supported on said last mentioned knife edges, two platform frames each resting on one end of the main lever frame and on one auxiliary lever frame, an upward extension of said housing, an indicator and a pendulum therein, and a connection from one of said auxiliary lever frames to said indicator and pendulum.

2. In a device of the class described, a housing, a main rectangular lever frame extending horizontally in the upper part of the housing with knife edge bearings in its transverse axis, two symmetrical auxiliary lever frames hanging under said main lever frame and pivotally supported therefrom, fixed pivots for said auxiliary frames at their outer ends, platforms each supported partly on the inner end of an auxiliary lever frame and partly on the corresponding outer end of the main frame, said housing having an upward extension above the inner end of one of the auxiliary lever frames, a pendulum in said extension, an indicator and a cam rigidly connected with said pendulum, and a flexible tape attached to the cam and adapted to wind thereon and extending thence down to the end of the auxiliary lever beneath.

3. In a device of the class described, a main lever fulcrumed across the middle of its length, an auxiliary lever under one end of the main lever, a link connecting the middle of the auxiliary lever to a point of the main lever intermediate between its end and its fulcrum, a frame under the auxiliary lever, four posts standing up at the four corners of said frame beside said levers, a platform on said posts, knife-edge bearings connecting the outer end of said frame with the outer end of the main lever, other knife-edge bearings connecting the inner end of the said frame with the corresponding end of the auxiliary lever, a pendulum above the inner end of the auxiliary lever, and a flexible tape connecting said end of said lever to said pendulum.

4. In a device of the class described, a pendulum, an indicator, and a cam rigidly connected therewith, a flexible tape connected to the cam and adapted to wind thereon and extending thence downwardly, and a lever system connected to the lower end of said tape, said lever system comprising two levers one above the other, a horizontal frame below both said levers, four posts standing up from the four corners of said frame beside said levers, a platform on said posts, and bearing connections from one end of said frame to one lever and from the other end of said frame to the other lever.

5. In a device of the class described, a main lever consisting of two parallel bars and cross members connecting them, five pairs of knife edges projecting oppositely from the outer sides of said bars, the middle pair of said knife edges resting on fixed supports, platforms resting partly on the end pairs of knife edges, auxiliary levers hanging on the remaining pairs of intermediate knife edges, said platforms resting partly on said auxiliary levers, a pendulum above one of the auxiliary levers, and a flexible tape connecting the end of said lever to said pendulum.

6. In a device of the class described, a main lever pivoted at the middle of its length, auxiliary levers under the ends of the main lever, platforms supported partly on the ends of the main lever and partly on the ends of the auxiliary levers, a housing about said levers, an upward extension of said housing at one side of the middle of the length of the main lever, a pendulum and an indicator in said housing, an arm from the auxiliary lever most remote from said upward extension of the housing, and a tape connecting the end of said arm to said pendulum.

In testimony whereof, I have subscribed my name.

JOSEPH HOPKINSON.

Witnesses:
JOSEPH WALES,
AMELIA WILKIE.

Copies of this patent may be obtained for five cents each, by addressing the "Commissioner of Patents, Washington, D. C."